United States Patent [19]

Drits et al.

[11] Patent Number: 5,095,258
[45] Date of Patent: Mar. 10, 1992

[54] LONGITUDINAL MOTION ERROR COMPENSATION APPARATUS METHOD AND APPARATUS FOR MULTIAXIS CNC MACHINE

[75] Inventors: Vladamir Drits, Minnetonka; Yevsey Gutman, Minneapolis, both of Minn.

[73] Assignee: Mar Engineering, Inc., Eden Prairie, Minn.

[21] Appl. No.: 458,284

[22] Filed: Dec. 28, 1989

[51] Int. Cl.$^5$ .............................. G05B 19/18
[52] U.S. Cl. ............... 318/569; 318/574; 364/474.06; 364/474.29
[58] Field of Search ............... 318/569, 574; 364/474.06, 474.29; 74/479; 108/20; 248/661

[56] References Cited

U.S. PATENT DOCUMENTS

| | | |
|---|---|---|
| 4,199,996 | 4/1980 | Moriwaki et al. ............ 74/479 X |
| 4,409,860 | 10/1983 | Moriyama et al. ............ 74/479 |
| 4,602,459 | 7/1986 | Drits et al. ............ 51/165.77 |
| 4,791,575 | 12/1988 | Watts et al. ............ 318/569 X |
| 4,963,803 | 10/1990 | Kokura ............ 318/569 |

Primary Examiner—William M. Shoop, Jr.
Assistant Examiner—Saul M. Bergmann

[57] ABSTRACT

A table for use with CNC machines has section one table feature being mounted for movement on the base and the other table section being mounted on the one table section. The table means are movable along mutually perpendicular axes, and are controlled in the axes. Motion error is compensated by providing feedback signals that sense and feed back position signals in one controlled axis as the table sections' are moved in the other perpendicular axis. Compensation for deviations in motion in the mutually perpendicular axis is provided so that position in each direction of motion is controlled by two feedback signals for error compensation.

8 Claims, 2 Drawing Sheets

LONGITUDINAL MOTION ERROR COMPENSATION APPARATUS METHOD AND APPARATUS FOR MULTIAXIS CNC MACHINE

BACKGROUND OF THE INVENTION

1. Field of the Invention

The present invention relates to motion error compensation for use with machine tool tables that are movable in two mutually perpendicular axes.

2. Description of the Prior Art

Control systems for controlling the position of a machine tool table, particularly in relation to adaptive control during machining, have been known. For example, U.S. Pat. No. 4,602,459 discloses a control system for precision machine tools that has a table adapted to be mounted onto an existing machine tool table and which provides a mounting that is specifically controlled by a piezoelectric actuator operated in an active closed loop system to maintain a set position without any backlash. The table disclosed in '459 comprises an extra structure over the existing machine tool table, which adds some extra cost, and in some applications the additonal cost is objectionable. The extra structure does decrease the rigidity of the machine as well. CNC machine tools have existing controls for controlling the table position in two or more axes through a servo control arrangement, but errors in motions of the table are not adequately controlled for precise positioning of such table along the respective axes of movement, even when the actuators in both control axes are very accurate. The sensors do not sense errors caused by nonperfect table slides, so such errors are not compensated.

SUMMARY OF THE INVENTION

The present invention relates to a control system operating in a closed loop on a longitudinally movable table for a machine tool using a closed loop feedback system for driving the part to be machined in two mutually perpendicular axes, and wherein the feedback includes not only signals for directly controlling the position of the table along the controlled axis, but also providing a secondary feedback signal for compensating motion errors in the controlled axis as it is moved in a mutually perpendicular axis, utilizing a reference surface and suitable position sensor.

As shown, a machine tool base supports a table assembly which includes a table section mounted for movement along a first or "X" axis. The table section which is movable in the "X" direction in turn supports a table section for movement in a "Y" direction, perpendicular to the "X" direction. The "X" and "Y" directions are axes that are mutually perpendicular. The normal error signal servo controls for a CNC machine are used for controlling the table. Servo systems operate with a programmed input command signal and a position feedback signal which is compared with the command. An error signal is used to drive the table to the correct position. The feedback for controlling movement in the "Y" axis an auxiliary or secondary reference sensor 36 which senses changes in the "Y" direction position as the table is moved in the "X" direction. The auxiliary feedback signal is used to adjust position in the "Y" axis for deviations caused during movements of both table sections along the "X" axis.

Likewise, controlling the table in its "X" axis is accomplished by having an "X" axis program operating through a known error signal control arrangement having a feedback sensor for directly sensing the movement in the "X" axis which is compared with the command signal to provide an error signal for control. The error signal is summed with a further auxiliary or secondary feedback signal that senses deviation of the table in the "X" axis as the second table section moves along the "Y" axis. This arrangement of providing a compensating signal for sensing movement in the controlled axis as the table moves in a mutually perpendicular axis provides for more accurate positioning of the table and thus a more accurate control for machining the machined part.

DETAILED DESCRIPTION OF THE PREFERRED EMBODIMENTS

Figure 1:
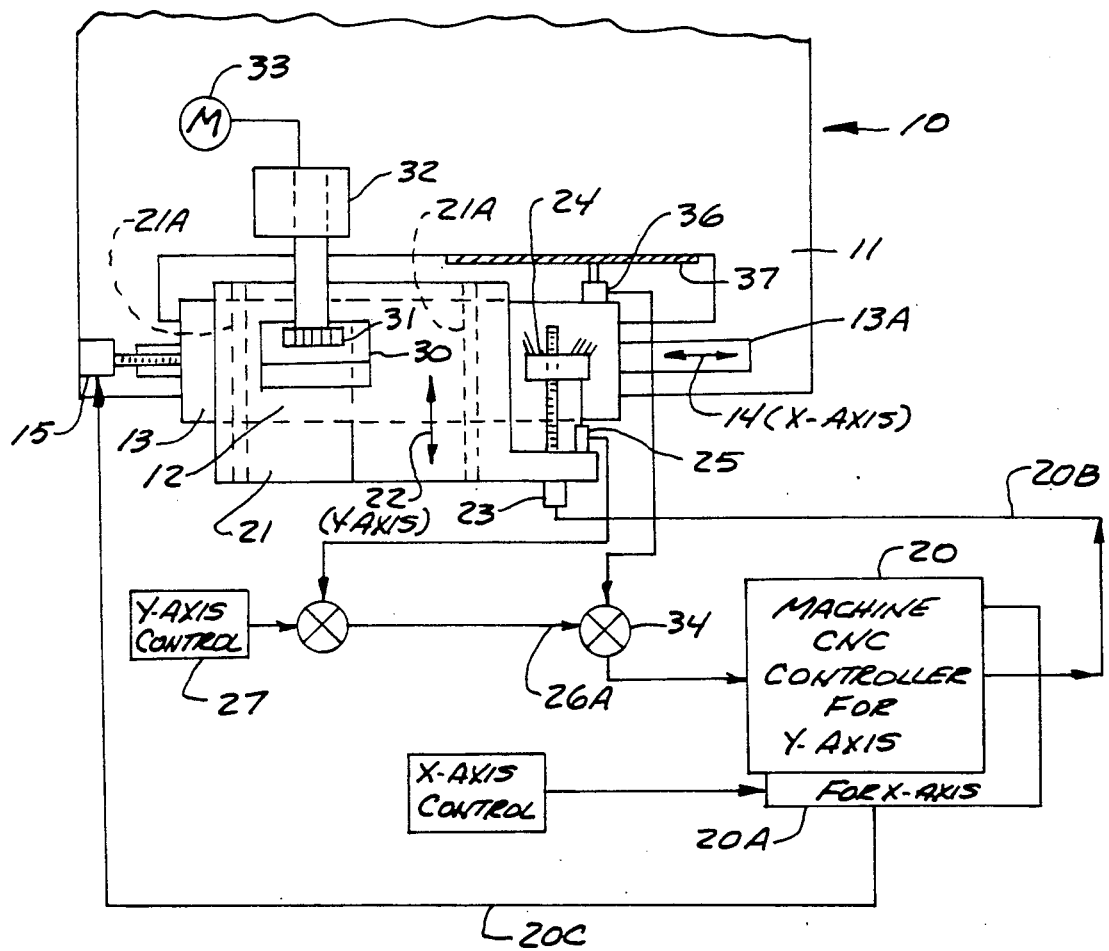
FIG. 1 is a schematic block diagram of a table for a CNC machine including an error compensation control for one axis made according to the present invention.

In FIG. 1 a general block diagram of a CNC machine tool indicated generally at 10, and includes schematically a machine base 11 that has a table assembly 12 mounted on the base. Table assembly 12 includes a first table section 13 that is directly mounted on the base 11 for movement on a conventional slide or guide 13A along an axis in opposite directions as indicated at 14. This is one axis of movement and comprises the "X" axis. The first table section 13 is moved by operating a driver motor 15 that is mounted relative to the base 11 with a screw to move and drive the table section 13 along the "X" axis in either direction of movement.

The first table section 13 is supported on suitable stable ways or guides 13A mounted on the base 11 and made in a known manner, and the position of the table section 13 is controlled through a CNC controller indicated generally at 20A that operates in a known manner for X axis control to provide drive signals along a line 20C to the drive motor 15 for control of movement in the "X" axis indicated by the arrow 14.

The table section 13 in turn supports a movable table section 21. Table section 21 is mounted on and in movable relative to the table section 13 in opposite directions along an axis as indicated by an arrow 22, which comprises the "Y" axis. The "X" and "Y" axes are mutually perpendicular to define a plane. The table 21 section is mounted on slides 21A attached to base table section 13. The table section 21 is thus supported for movement in two mutually perpendicular axes. The table section 21 is driven by a "Y" axis driver motor 23 which can operate a screw 23A in either direction in a suitable manner. The screw 23A threads through a block 24 fixed to base table section 13. Operation of motor 23 drives the table section 21 along the "Y" axis relative to the table section 13. The motor 23 is controlled from a CNC controller 20 by signals on a line 20B.

In this form of the invention, conventional feedback signals are used in a closed servo loop through the CNC controller to control the "Y" position of table section 21 relative to base table section 13 and are provided by a feedback signal transducer 25 which directly senses the position of table section 21 along the "Y" axis. The feedback signal is fed into a summing junction 26 where it is summed with a command input signal from a programmed command source 27 that controls the desired position in the "Y" axis of a part 30 mounted on the table section 21 and which is to be machined with a cutting tool indicated generally at 31. The cutting tool 31 is rotatably mounted in a suitable housing or bearing 32, and is driven by a motor 33 in a conventional manner.

The summing junction 26 has an output line 26A that leads to a second summing junction 34 used in the present invention, which sums the signal on line 26A with a signal on a line 35 coming from a sensor 36 which senses deviation in position from the position set by motor 23 and sensor 25 as the as the table section 13 is moved in either direction along the "X" axis. The sensor 36 has an end that slides along a reference surface 37 on the base 11 to provide for compensation of errors or shifts of the section 21 in the "Y" axis as the table section 13 (and thus table section 21 which is carried on table section 13) moves along the "X" axis. This compensation feedback adjusts the table section 21 by providing an error signal to summing junction 34 and then to the CNC controller 20. Suitable drive signals are provided to the "Y" axis drive control for motor 23. The motor 23 is controlled by the controller 20.

Error signal control without the additional compensation is conventional servo control systems where a programmed input signal for machining a part 30 is provided for each individual axis. Each signal represents the position of the table section 13 or 21 in space so that the part 30 is properly positioned in the respective axis as the program progresses. The feedback signals from conventional sensors then determine where the table actually is, and in normal conditions, the error signal from the summed command and feedback signals will indicate the amount of error with respect to the program signal that is present and this error signal then will be used to drive the appropriate drive motor to bring the table section back to its desired position. However, in conventional systems the only "Y" axis feedback sensor is sensor 25 and as the table is moved in the "X" axis movements between base 11 (which mounts tool 31) and the table section 13 can occur in the "Y" axis. These movements will not be sensed by sensor 25, but will be sensed and can be compensated by sliding sensor 36. Thus, ordinary error signal control does not adequately compensate for table movement or shifting in one axis, caused by backlash or imperfections in the slides or guides for the table section which is moving along a perpendicular axis.

The compensation signal for "Y" axis movement from sliding sensor 36 can be used to drive a separate fine adjusting screw mounted in series with the motor 23, rather than adjusting the motor only. Also, a very fine adjustment accessory or auxiliary table, which is adjustable in both the "X" and "Y" axis, as shown herein, can be mounted on table 21 to hold the part, and then sensor 36 would control position of the accessory or auxiliary table for compensation.

Figure 2:
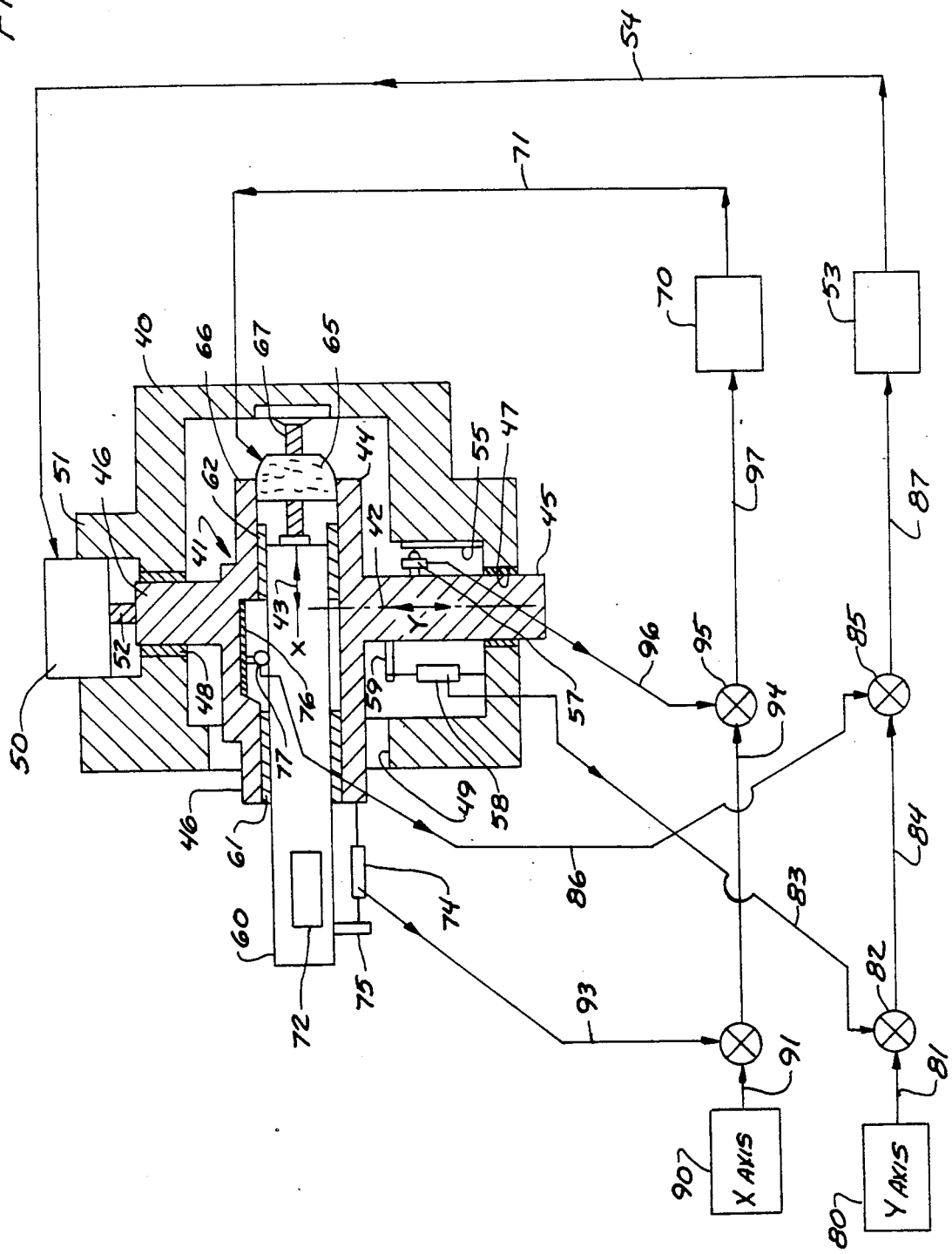
FIG. 2 is a more detailed schematic representation showing details for controlling the position of a machine tool table in two mutually perpendicular axes, through a servo control compensated according to the present invention.

FIG. 2 is a more detailed schematic showing of the invention including controlling the table assembly in both axes of movement through a compensation control. In this form of the invention, a machine tool base is shown schematically at 40, and also schematically, a table assembly 41 is mounted for movement relative to the base 40 in two axes which are mutually perpendicular namely a "Y" axis indicated at 42, and the "X" axis indicated at 43.

As shown in this form of the invention, the first table section 44, which is movable along the "Y" axis, has a pair of support hubs 45 and 46 which are slidably mounted in suitable close-fitting linear bearings 47 and 48 that are provided on the base 40. These hubs and bearings closely guide the table section 44 for movement along the "Y" axis. The table section 44 also includes a hub portion 46 that can be supported for sliding movement on a section 49 of the base 40 to provide stability.

A driver motor 50 has its outer case mounted relative to the base 40 in a suitable hub 51. The motor 50 has an actuator screw 52 that is coupled for linear driving movement to the hub portion 46 of the table section 44. Upon rotation of the actuator motor 50, the table section 44 will be moved selectively in opposite directions along the "Y" axis 42 in the bearings or guides 47 and 48 and also as supported or guided on the base section 49. The CNC controller in this form of the invention includes a servo controller section 53 that provides an output signal along a line 54 to drive the motor 50 to move the selected drive screw 52 in directions along its axis for controlling the position of the table section 44 along the "Y" axis.

As shown, the base 40 has a reference surface 5 that is precisely parallel to the "Y" axis 42, and a sliding "X" axis position sensor indicated generally at 57 is mounted on a portion of the table section 44 and engages the reference surface 55 to sense deviations of the table section 44 in the "X" axis. This sensing is accomplished as the table slides along the "Y" axis, because the sensor is made to slide along the surface 55. The positioning of the table section 44 relative to the base 40 is sensed with a sensor 58 connected between the base 40 and an arm 59 that moves with table section 44.

A second table section 60 is mounted on the first table section 44, and forms part of the table assembly 41. Table section 60 is supported in or on suitable guideways 61 and 62 that are spaced apart in the direction along the "X" axis 43. The guideways provide for sliding movement of the table section 60 along the "X" axis. The movement along the "X" axis is controlled in opposite directions as previously explained. A driver motor 65 has an outer case that is mounted in a hub portion 66 of the table section 44, and the driver motor drives a screw 67 that is coupled to move the table section 60 in opposite directions along the "X" axis as guided in the bearings or guideways 61 and 62. The coupling for rotatably attaching the screw to the table section 60 for accomplishing movement in opposite directions is conventional. The screws for driver motors 50 and 65 extend through the respective motor, so that opposite direction movement is possible.

The driver motor 65 is controlled from a servo controller 70 that provides an output signal along a line 71 to control the motor 65 in its proper direction. The polarity of the output signal on line 71 determines the direction of motor rotation, and the appropriate sign of the various signals can be selected to achieve the desired results.

The table section 60 supports a piece part 72 that is to be machined, and the position of the table section 60 and the piece part in the "X" axis is determined by sensing the table position with an "X" axis displacement sensor 74 that senses the position of section 60 relative to the table section 44. This is accomplished by having the sensor 74 anchored onto the table section hub portion 46 of table section 44, as shown, with the other end or part of the sensor 74 mounted onto a suitable attachment member 75 connected to the table section 60.

The table section 44 which mounts table section 60 has a reference surface 76 that is precisely parallel to the "X" axis 43. A sliding distance sensor 77 is mounted on the table section 60 and has an indicator that slides along the surface 76.

It should be noted that the surface 76 is between the supports 61 and 62 for the "X" axis table section 60, and thus the relationship to table section 60 is very stable. Any deviation of the table section 60 in direction along the "Y" axis will be sensed by the sensor 77. The surface 55 and sensor 57 also are mounted between the supports for the "Y" axis table section 44. The compensation sensors 77 and 57 provide signals to secure changes in one axis as the respective table section moves in a perpendicular axis.

The control of movement along the "Y" axis is in response to a "Y" axis program command signal provided from a function generator or other suitable signal source 80. The source 80 provides a programmed position signal for the desired position of the work piece 72 along a line 81 to a summing junction 82. For conventional "Y" axis control, the summing junction 82 sums a feedback signal along a line 83 from the direct "Y" axis position sensor 58, and this summing provides an error signal along a line 84 to adjust the table portion until a null is reached at the summing junction 82. For compensation, in this invention, however, a second summing junction 85 is provided in series with the summing junction 82 and it receives a secondary feedback signal along a line 86 from the sensor 77 which senses the deviations in the "Y" direction of the table section 60, as the table section 60 moves in the direction so that any error in position while the table section 60 moves will be compensated. The compensated error signal on line 87 is provided to the controller 53 to drive motor 50 appropriately.

This provides for an active compensation as the table section 60 is controlled.

Likewise, an "X" axis command program source 90 provides an output command signal along a line 91 to a summing junction 92 which receives a direct feedback signal from the "X" axis sensor 74 along a line 93. An error signal indicating deviation from a desired position is provided along a line 94 to a second summing junction 95. Summing junction 95 receives a signal along a line 96 from the sensor 57 which will indicate changes in the "X" axis position of the table section 44 as the table section 44 is moved along the "Y" axis. The compensated error signal is provided along a line 97 to the controller 70. The drive signal along line 71 to control the motor or driver 65 is thus corrected for error in "X" axis portion as table section 44 is moved in direction along the "Y" axis.

Thus, the position of the table sections can be compensated or corrected by determining shifts in one axis as movement occurs in another axis. In other words, when the "Y" axis driver motor 50 is driving the table section 44 along the "Y" axis, deviations in the "X" axis because of the sliding or movement of the table section 44 will be sensed by the sensor 57, to provide a signal along a line 96 to the summing junction 95 and provide a compensating or correction signal for slight adjustments in the "X" axis along line 97 and through the controller 70 to drive the "X" axis drive motor 65.

If the table section 60 is being controlled or moved along the "X" axis 43 by the drive motor 65, any deviations in its "Y" axis position as table section 60 slides will be sensed by the sensor 77. Sensor 77 provides a signal to the summing junction 85 along the line 86 and if deviations occur a signal will be provided to the controller 53 to drive the motor 50 to provide for compensation or correction of deviations in the "Y" axis. There is active compensation for movements in each of the controlled axes when there is movement in at least one of the other controlled axes.

The same arrangement is usable with three controlled axes, for example, movement of a table in the "X", "Y" and "Z" axes.

The arrangement compensates for errors that can arise when a table is moved along one axis by driving the table along the other axis in response to a sensor.

Again, the table arrangement shown in FIG. 2 can represent a conventional table with the addition of the reference surfaces and auxiliary sensor 57 and 77 to control existing tables. The controls can thus be easily added to machine tools in the field. The table shown in FIG. 2 also could be an auxiliary table assembly mounted on a movable machine tool table and used for fine adjustments while the main machine tool table was used for major position changes. In such a case, the driver for positioning the part in each of the "X" and "Y" axes would be two motors and actuators, one on the main machine tool table and fine adjustment on the auxiliary table.

Although the present invention has been described with reference to preferred embodiments, workers skilled in the art will recognize that changes may be made in form and detail without departing from the spirit and scope of the invention.

What is claimed is:

1. A machine tool table comprising:
   a base;
   a first table section movable along a first axis relative to the base;
   first driver means for driving the first table section along said first axis in response to a control signal;
   a second table section mounted for movement relative to the first table section along a second axis;
   second driver means for driving the second table section along the second axis in response to a control signal; and
   first and second controller means for providing the control signals to the first and second driver means, respectively, at least the second controller means providing a drive signal as a function of feedback means sensing position of the first table section in direction along the second axis, which feedback means senses deviations of the second table section from a desired position along the second axis relative to the base in a controlled axis as the first other table section is moved along the first axis.

2. The machine tool table of claim 1 wherein the feedback means senses movement of the first table section in direction of the second axis between a reference surface fixed relative to the base and the first table section as the first table section is moved in direction along the first axis and controls the driver for the second table section to move the second table section in response to the feedback means.

3. The machine tool table of claim 1 wherein the feedback sensor is mounted to move with the first table section and slides along a reference surface parallel to the first axis to sense deviations of the first table section in direction along the second axis, the feedback sensor providing a compensation signal to the driver means for the second table section in response to such deviations.

4. The machine tool table of claim 1 wherein said first and second controlling means comprise:
 means for providing a programmed signal for control of the second section along the second axis;
 first feedback means between the second table section and the first table section for determining position of the second table section along the second axis;
 first comparison means for comparing a preprogrammed position control signal for the second table section and a signal from the first feedback means to provide an uncompensated error signal;
 second compensation sensor means for sensing the position of the first table section in direction along the second axis relative to the base as the first table section is moved along the first axis; and
 a second comparison means receiving the uncompensated error signal and a signal from the second compensation sensor means for providing a signal that is compensated to control the driver for the second table section along the second axis.

5. A control system for a machine tool table having a base and a table having a portion movable along separate first and second mutually perpendicular axes comprising control means for separately controlling movement of the table portion along the respective first and second axes relative to a tool mounted on the base, and first feedback means to determine position changes of the table portion relative to the tool along the first axis caused by movement of the table portion by the control means along the second axis, the first feedback means being coupled to the control means to correct deviations of the first table portion from a reference position along the first axis.

6. The control system of claim 5 and second feedback means to determine position changes of the table portion in direction along the second axis as the table portion is also moved by the control means along the first axis, the second feedback means being coupled to the control means to correct deviation of the table portion from a desired position along the second axis.

7. A servo controlled machine tool table comprising:
 a first table section movable along a first axis relative to a base;
 a second table section mounted for movement along a second axis perpendicular to the first axis which also moves in direction along the first axis when the first table section moves along the first axis;
 first and second controller means and first and second driver means for controlling movement of the first and second table sections, respectively, the second controller means providing a drive signal to its associated driver means providing a drive signal to its associated driver means as a function of the feedback sensor means sensing position the second table section in direction along the second axis relative to the base as the first table section is moved along its controlled axis.

8. The machine tool table of claim 1 wherein the base has a surface portion forming a reference surface parallel to the first axis, and the feedback means comprises a sliding sensor mounted on the first table section and sliding along the reference surface as the first table section moves along the first axis.

* * * * *